United States Patent [19]
Takahashi

[11] Patent Number: 5,901,806
[45] Date of Patent: May 11, 1999

[54] VEHICLE SPEED CONTROL SYSTEM

[75] Inventor: Hiroshi Takahashi, Tokyo, Japan

[73] Assignee: Nissan Motor Co., Ltd., Kanagawa, Japan

[21] Appl. No.: 08/991,604

[22] Filed: Dec. 16, 1997

[30] Foreign Application Priority Data

Dec. 16, 1996 [JP] Japan .................................. 8-335688

[51] Int. Cl.⁶ .................................................. B60K 31/00
[52] U.S. Cl. ...................... 180/170; 180/179; 180/167; 701/96
[58] Field of Search .................................... 180/167, 169, 180/170, 178, 179; 701/96, 98

[56] References Cited

U.S. PATENT DOCUMENTS

| | | | |
|---|---|---|---|
| 5,495,251 | 2/1996 | Gilling et al. | 180/170 |
| 5,587,908 | 12/1996 | Kijiwara | 180/170 |
| 5,609,217 | 3/1997 | Honda et al. | 180/170 |
| 5,670,953 | 9/1997 | Satoh et al. | 180/170 |
| 5,708,584 | 1/1998 | Doi et al. | 180/170 |
| 5,771,007 | 6/1998 | Arai et al. | 180/170 |

FOREIGN PATENT DOCUMENTS 4-244434 9/1992 Japan .

Primary Examiner—Richard M. Camby
Attorney, Agent, or Firm—McDermott, Will & Emery

[57] ABSTRACT

A vehicle speed control system for automatically sustaining a vehicle speed at a driver's setting, and decreasing the vehicle speed with decrease in a distance to a vehicle ahead, includes an input section for collecting information on a road situation ahead and a controller for adapting the speed control characteristic to the road situation. The input section of one embodiment includes an image sensing camera for forming an electronic image of the road ahead, and the controller is configured to detect edges such as derivative edges in the image and determine a correction quantity in accordance with the number of detected edges. The controller adjusts the control characteristic by using the correction quantity.

16 Claims, 12 Drawing Sheets

VEHICLE SPEED CONTROL SYSTEM

The contents of a Japanese Patent Application No. 8-335688 with a filing date of 16 Dec. 1996 in Japan are hereby incorporated by reference.

BACKGROUND OF THE INVENTION

The present invention relates to a vehicle control system, and more specifically to a vehicle-to-vehicle distance controlling type adaptive cruise control (ACC) system capable of maintaining a proper vehicle-to-vehicle distance and a proper vehicle speed in all driving circumstances.

A Japanese Patent Provisional (Kokai) Publication No. 4-244434 discloses a conventional cruise control system. This control system includes an input or sensor section, a controller section and an output or actuator section. The output (or actuator) section includes a throttle actuator for varying the vehicle speed by varying the opening of a throttle valve for an engine. The input (or sensor) section includes a first subsection for sensing an actual vehicle speed, and a second subsection adapted to be operated by a driver to input a desired set speed. The controller section includes an ACC controller for automatically maintaining the vehicle speed at the driver's speed setting by sending a control signal to the throttle actuator to control the opening of the throttle valve. The input section further includes a third subsection including a distance measuring device, such as a laser radar, for measuring a vehicle-to-vehicle distance between the controlled vehicle and another vehicle ahead. The controller section functions to control the vehicle speed so as to sustain an adequate vehicle-to-vehicle distance. Moreover, the controller section calculates a road traffic density in accordance with the vehicle-to-vehicle distance. The controller section increases a gain for the vehicle-to-vehicle distance control when the traffic density is high, and decreases the gain when the traffic density is low. The vehicle can respond sensitively to the widely changing vehicle-to-vehicle distance when the traffic is heavy. When the traffic is sparse, the control performance is smooth and mild.

SUMMARY OF THE INVENTION

It is an object of the present invention to provide a vehicle control system capable of adapting a control characteristic adequately to the environment of the vehicle.

According to the present invention, the control system estimates the driver's recognition to the driving environment indirectly by using the concept of affordance, and thereby determines an adequate value of a control parameter in the control characteristic.

The above-mentioned conventional speed control system monitors only the traffic density or the number of cars on the road, so that the system cannot adapt the control characteristic properly to the situation of the road, and the driver might feel unnatural or uncomfortable feeling. When, for example, the road is new to the driver, the driver wishes to drive carefully notwithstanding sparseness of the traffic. In this situation, the speed control performance of the conventional system is neither sensitive nor suitable to driver's expectation.

The present invention can solve the above mentioned problem. An automatic constant speed control system (or auto cruise control system) for regulating the vehicle speed while sustaining a proper distance from another vehicle ahead is arranged to monitor how the driver recognizes the situation of the road environment such as road atmosphere, to determine a control characteristic in accordance with the result of monitoring and to set a vehicle-to-vehicle distance and a vehicle travel speed in accordance with the control characteristic. By so doing, the control system according to the present invention can provide a speed control performance matching the road situation.

The present invention is based on the following notion.

A driver becomes careful on a new road where a road situation ahead is unpredictable to the driver. The driver gains the ability of driving down that road smoothly through repetition of driving experience on that road. In this state, the vehicle speed is kept steady without much change, and the dispersion or variation in the driver's accelerator operation is small. With the driver's capability of anticipating the situation, such as topographic features, possibilities of disturbance and dead angles, of a road section to which the vehicle is heading, the driver can maneuver the vehicle smoothly. It is not the environment of the road itself but the driver's manner of recognizing the environment that determines the speed control characteristic desirous to the driver. It is not objects in the real world but the impression given on the driver by the objects that determines the driving behavior of the driver.

As to the above-mentioned relation between environment and an actor, the concept of affordance is introduced by J. J. Gibson (J. J. Gibson "Notes on affordances, Reasons for realism", Hillsdale, Lawrence Erlbaum Associates 1982). Affordance can be considered to be information on an invariant relation between an actor and an environment perceived by the actor. The factor making the driver to decide on how to act or how to drive in the given environment is "seeing" of an object in the field of view. The driver will change the manner of driving in response to a change in "seeing", regardless of the number of vehicles in view being unchanged. Therefore, it is not only the physical, objective phenomenon in the form of road traffic that determines a desirable speed control performance to the driver. The driver perceives an affordance which is invariant information intervening between the driver and a road, this perception creates selective attention, and the selective attention determines a pattern of driving the driver desires as a result of the recognition of the environment. The control system according to the present invention is designed to control the vehicle-to-vehicle distance and the vehicle speed by observing the affordance engineeringly and modifying the control characteristic in accordance with the affordance to provide a control performance satisfactory to the driver.

In one embodiment of the present invention, the control system estimates a driving road environment recognition characteristic to a driver, and modifies either or both of the vehicle-to-vehicle distance and the controlled vehicle speed in accordance with the recognition characteristic. The driving road environment recognition characteristic corresponds to the before-mentioned affordance, and to a later-mentioned quantity C.

The environment recognition characteristic is estimated, for example, from a difficulty in obtaining vista along a forward road ahead of the vehicle. The difficulty in obtaining vista or distant view is a factor representing a complicatedness in "seeing" of the scene of facilities, parked cars and other objects near the road. The control system can detect the difficulty in obtaining vista, for example, from the number of edges (representing the roadside facilities, parked cars and other objects) in a picture of the forward road, or a regional ratio between the area of one or more regions having luminance within a predetermined range (representing a road surface), and the total area of a picture of the forward road (or the area of the remaining region or regions). The regional ratio may be a ratio between the area of one or more regions of a color (representing a road surface) and the total area of a picture of the forward road (or the area of the remaining region or regions).

Furthermore, the environment recognition characteristic can be estimated from a road condition such as a road width, a road attribute and a number of intersections. The road attribute is a rank or type of a road. For example, highways, roads for automobiles only, ordinary national roads and streets are classified into respective different ranks or types. The control system can obtain information about the road condition from an onboard navigation system, or from an information communicating means such as a roadside beacon or a roadside communicating system of a traffic infrastructure, or from imagery of a forward road.

Furthermore, the environment recognition characteristic can be estimated from a standard deviation of an accelerator opening over a predetermined time interval before a constant speed control operation.

The speed control system according to the present invention can control the vehicle-to-vehicle distance in accordance with the situation of the surroundings, so that the vehicle can follow a forward vehicle ahead with an adequate separation giving the driver a sense of security. When there is no vehicle ahead, the control system can control the vehicle speed without arousing an unnatural or uncomfortable feeling in the driver. Therefore, the constant speed control becomes usable even on ordinary roads besides highways. The present invention can widen the applicability of the constant speed control. By eliminating the need for intervention of the driver, the control system of the present invention can lessen the fatigue of the driver.

DETAILED DESCRIPTION OF THE INVENTION

Figure 1:
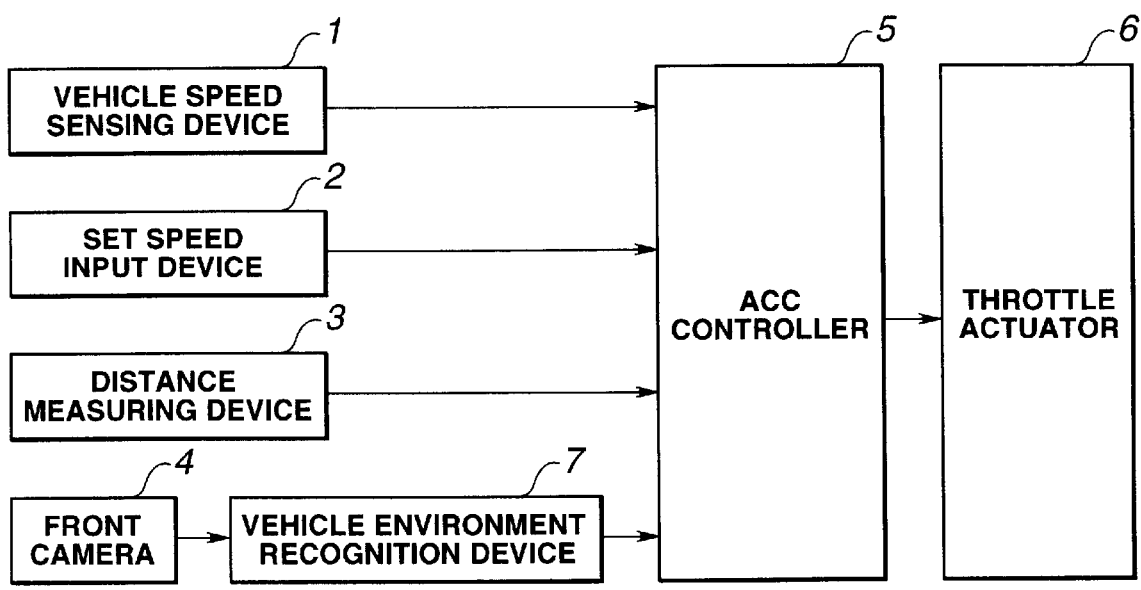
FIG. 1 is a block diagram showing a vehicle speed control system according to a first embodiment of the present invention.

FIG. 1 shows a vehicle speed control system according to a first embodiment of the present invention.

The control system shown in FIG. 1 is arranged to control the speed of a controlled vehicle on which this control system is mounted. The control system comprises an input section, a controller section and an actuator section (or output section).

The input section comprises a vehicle speed sensing device 1, a set speed input device (or speed setting device) 2 and a distance measuring device 3. The vehicle speed sensing device (or vehicle speed sensor) 1 senses an actual vehicle speed of the vehicle. For example, the vehicle speed sensing device 1 comprises one or more sensors for sensing the rotational speed or speeds of one or more road wheels of the vehicle. The speed input device 2 is a device for enabling the driver of the controlled vehicle to input a desired set speed (or cruise speed). The distance measuring device 3 is a device, such as a laser radar, for measuring a vehicle-to-vehicle distance between the controlled vehicle and another vehicle ahead.

The controller section comprises an adaptive cruise control (ACC) controller 5 connected with the devices 1, 2 and 3 of the input section to receive signals from these devices. The ACC controller 5 of this example includes, as a main component, an onboard CPU.

The actuator section shown in FIG. 1 comprises a throttle actuator 6 for controlling an opening of a throttle valve for an engine of the vehicle to control the vehicle speed in response to a control signal supplied from the ACC controller 5.

The ACC controller 5 further sends signals to a brake actuator and an automatic transmission controller. In this embodiment, the throttle actuator 6 is used as a main component of the actuator section for accelerating and decelerating the vehicle.

The control system shown in FIG. 1 further comprises a forward viewing camera 4 and a vehicle environment recognition device 7. The camera 4 is aimed forward to image the scene ahead including the road in front of the vehicle. The recognition device 7 receives a signal from the camera 4 and recognizes driving environment of the vehicle as explained later. An output signal of the recognition device 7 is supplied to the ACC controller 5. The recognition device 7 of this example includes, as a main component, an onboard CPU. It is, however, possible to use the onboard CPU of the ACC controller 5, as a processing unit of the recognition device 7.

This control system controls the speed of the vehicle in the following manner.

From the vehicle speed signal v(t) at an instant t, obtained from the vehicle speed sensing device 1, the set speed VS determined by the driver, and the vehicle-to-vehicle distance (or forward interspatial distance) L(t) at the instant t between the controlled vehicle and another vehicle going ahead along the same lane of the road, the ACC controller 5 determines an throttle opening command θ(t) for the throttle actuator 6 according to a functional relationship expressed by the following equation.

$$\theta(t)=F[VS, v(t), L(t)] \qquad (1)$$

Qualitatively, this control is a regulator control for making the vehicle speed signal v(t) equal to the set speed VS. When the vehicle-to-vehicle distance L(t) becomes smaller than a predetermined distance value, a desired travel speed vs is monotonically decreased with respect to the distance L(t). Namely, this control system decreases the vehicle speed monotonically as the distance L(t) decreases in the range below the predetermined distance value. The ACC controller 5 of this example determines the throttle opening command 6(t) of the equation (1) by first calculating the desired travel speed vs, and further calculating the throttle opening required to achieve the calculated travel speed vs.

When the distance from the ahead-going vehicle is greater than the predetermined value (when the system judges that there exists no ahead-going vehicle), the vehicle is driven at the set speed VS. When the distance is equal to or smaller than the predetermined distance value, the vehicle speed is controlled to the travel speed vs determined in accordance with the distance.

In addition to the above-mentioned normal ACC control, the control system of this embodiment performs the following control. In this embodiment, the driving environment recognition device 7 receives the signal from the camera 4, follows a control flow shown in FIG. 3 and thereby calculates a degree of negative affordance perception to the driver.

Figure 2:
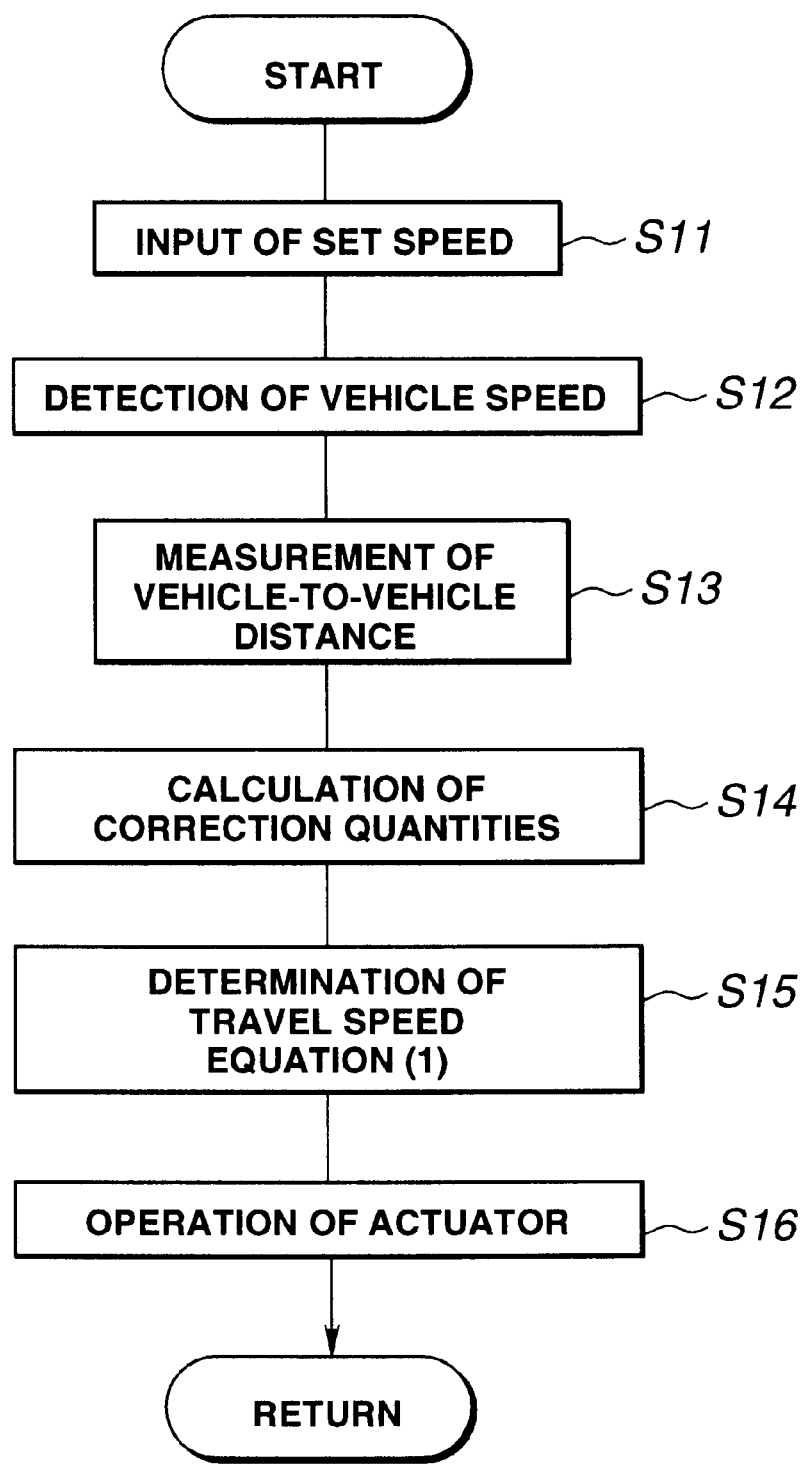
FIG. 2 is a flowchart showing a part of a control procedure performed by the control system of FIG. 1.
Figure 3:
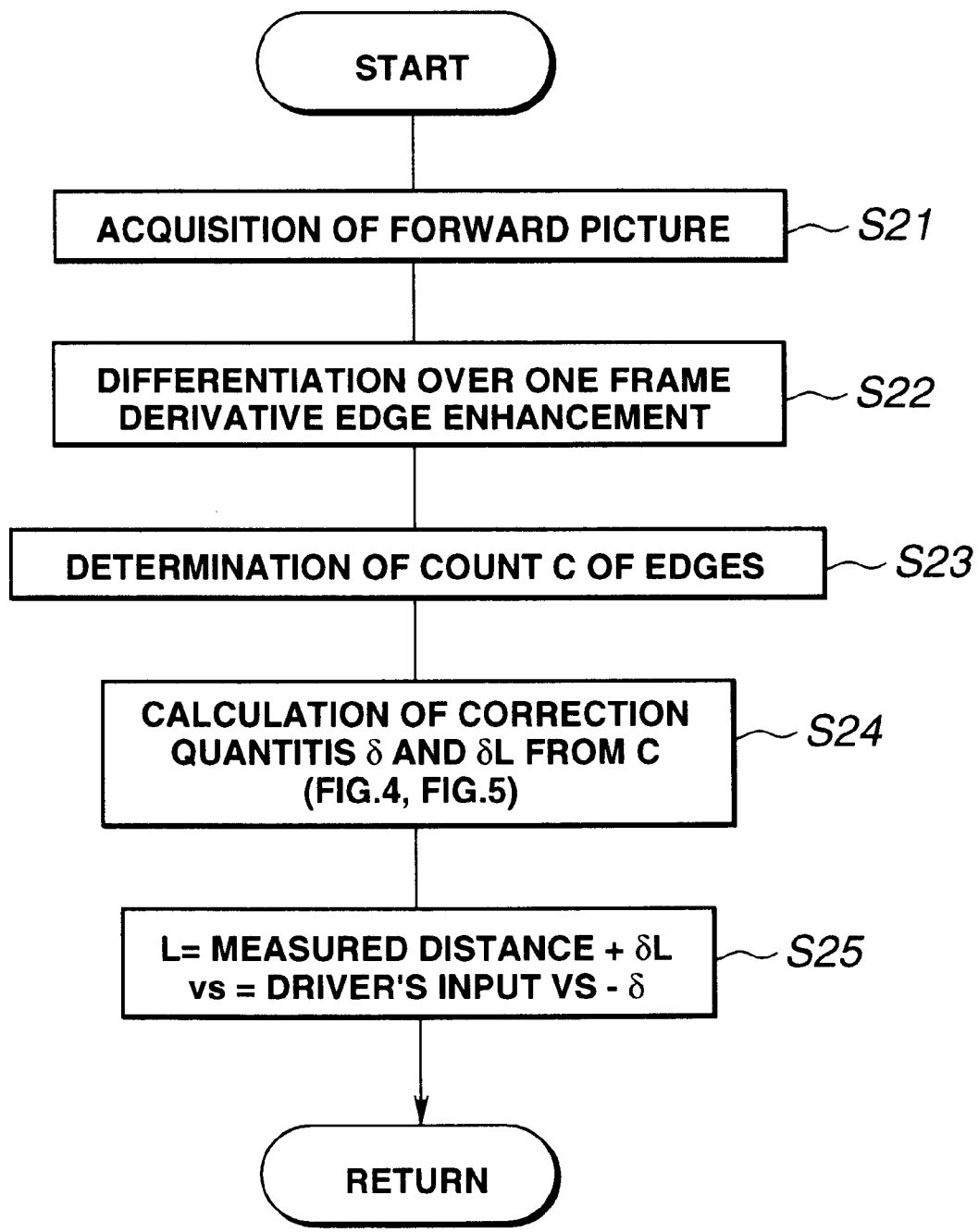
FIG. 3 is a flowchart showing the remaining part of the control procedure shown in FIG. 2.

FIG. 2 shows a control process performed by the control system inclusive of the ACC controller 5. FIG. 3 shows steps 14 and 15 of FIG. 2 more in detail.

At a step S11 of FIG. 2, the control system obtains the set speed VS inputted by the driver. At a step S12, the control system obtains the sensed actual vehicle speed (by receiving the vehicle speed signal v(t)). At a step S13, the control system obtains the measured vehicle-to-vehicle distance L(t).

Then, the control system calculates correction quantities at the step S14. At the next step S15, the control system determines the travel vehicle speed vs in accordance with the results of the calculation of the step S14, and determines the throttle opening command 6(t) (expressed by the equation (1)) to achieve the travel speed vs. At a step S16, the control system delivers the control signal to the throttle actuator 6. In response to the control signal, the throttle actuator 6 controls the throttle opening degree of the throttle valve to the throttle opening command θ(t). By so doing, the throttle actuator 6 controls the vehicle speed.

The calculation of the correction quantities at the step S14 and the determination of the travel speed at the step S15 are performed as shown in FIG. 3.

At a step S21 of FIG. 3, the environment recognition device 7 takes in a forward image picture from the camera 4. At a step S22, the recognition device 7 performs differentiation separately along the vertical direction of the frame of the picture and along the horizontal direction of the picture frame, and thereby extracts vertical edges and horizontal edges.

At a step S23, the control system counts the number of edges obtained by the differentiation, and thereby determines a quantity C which, in this example, is the number of detected edges. This quantity C is a variable (road environment recognition characteristic) representing a degree of complicatedness in "seeing" (or visual perception) of a scene of the road and roadside facilities. If the surroundings of the road are complicated and congested, the quantity C becomes high and the driver comprehends that the circumstances are complicated. In these circumstances, there are many objects of negative affordances, and the driver hopes to drive carefully and unhastily. To fulfill the driver's hope and increase the reliability of the ACC control, this control system modifies the control characteristic of the equation (1) by making the distance L greater. When there is no vehicle ahead, the travel speed vs is made equal to the set speed VS in the case of the normal ACC control, but the travel speed vs is set at a smaller value if the quantity C is high.

Figure 4:
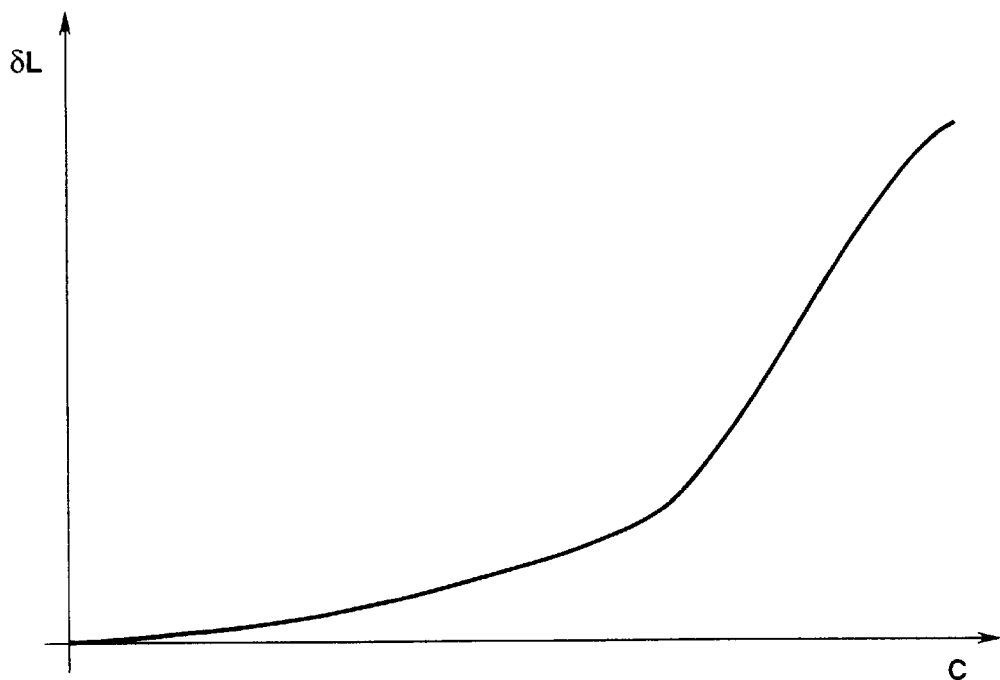
FIG. 4 is a graph showing a relationship between a first correction quantity $\delta L$ and a quantity C, used in the control system shown in FIGS. 1, 2 and 3.
Figure 5:
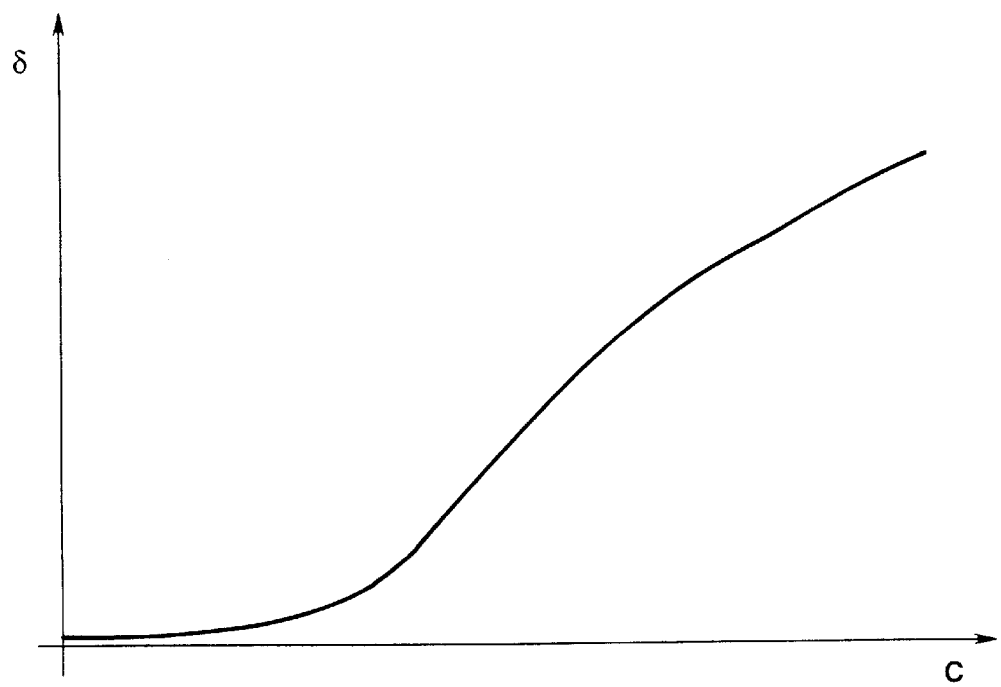
FIG. 5 is a graph showing a relationship between a second correction quantity $\delta$ and the quantity C, used in the control system shown in FIGS. 1, 2 and 3.

In this example, from the quantity C determined at the step S23, the control system determines a first correction quantity δL for the vehicle-to-vehicle distance L(t) and a second correction quantity δ for the travel speed vs according to characteristics shown in FIGS. 4 and 5. At a step S25, the control system determines a corrected distance L and a corrected travel speed vs according to the following equations (2) and (3).

$$L=L(t)+\delta L \qquad (2)$$

$$vs=VS-\delta \qquad (3)$$

As expressed by the equation (2), the corrected distance L is greater than the measured distance L(t) by the correction quantity δL. The corrected travel speed vs is smaller than the set speed VS by the correction quantity δ, as in the equation (3).

FIG. 4 shows a characteristic relationship between the quantity C and the first correction quantity δL. FIG. 5 shows a characteristic relationship between the quantity C and the second correction quantity δ. Each of the first and second correction quantities δL and δ increases monotonically with increase in the quantity C. As shown in FIGS. 4 and 5, the characteristic curves are not linear and not simple. These characteristics are stored in the form of data maps in this example.

When the surroundings are congested (obstructing a distant view), the quantity C representing the road environment recognition characteristic becomes greater, and the control system controls the speed of the vehicle so as to increase the vehicle-to-vehicle distance and to decrease the travel speed. Accordingly, the driver can feel at ease, and rely on the ACC control. This control system makes it possible to use the ACC control in a wider variety of situations.

The control system of this embodiment employs the number of edges as an index indicating the degree of complicatedness in "seeing". It is, however, optional to employ a system for radiating a wide angle radar beam and receiving reflection. Features in a Doppler spectrum of the reflection are indicative of the degree of complicatedness of objects in front of the vehicle. When, for example, the Doppler spectrum of the reflection has components at high frequencies or exhibits a wide distance distribution, then the degree of complicatedness is high. Therefore, it is possible to control the speed of the vehicle in the same manner by using these results of the detection.

Figure 6:
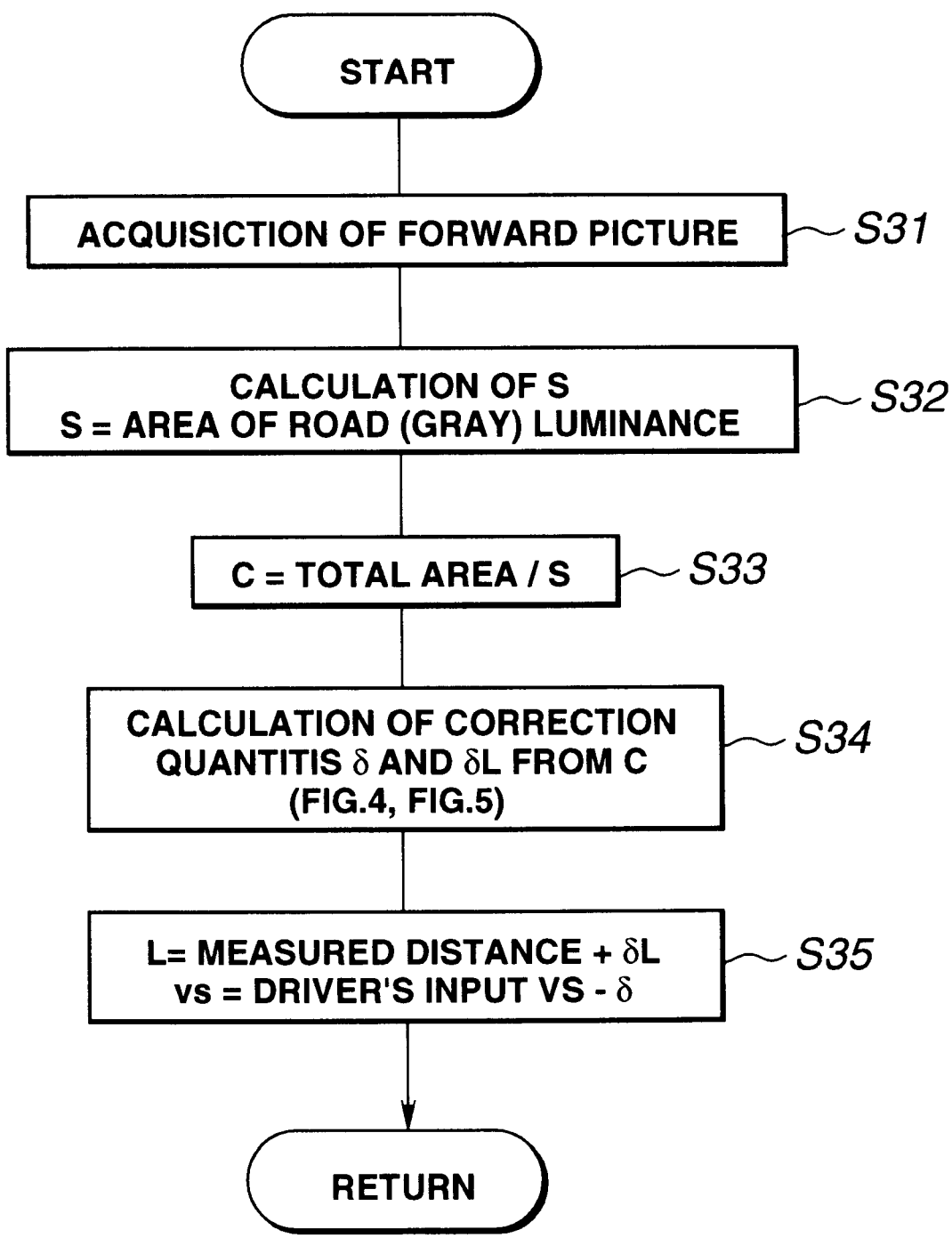
FIG. 6 is a flowchart showing a control procedure according to a variation of the first embodiment.

FIG. 6 shows a variation of the first embodiment. Instead of the edge detection of FIG. 3, the control system extracts one or more image regions having attributes similar to the image attribute of a road surface. For example, the image attribute is luminance for a monochrome picture or color (or chrominance) for a color picture. The control system extracts one or more regions having the image attribute corresponding to the image of a road surface from the luminance signal or the chrominance signal, and determines the ratio of the total area T of the picture (or the area of one or more regions other than the road surface) to the area S of the one or more extracted regions. The quantity C of this example is the ratio (T/S) of the total picture area T to the area S of the road surface image attribute.

At a step S31 of FIG. 6, the control system obtains the forward image of the scene ahead from the camera 4. At a step 532, the control system calculates the area S of the region or regions having substantially the same luminance (or the same color: gray) as the road surface. At a step S33, the control system calculates the quantity C by dividing the total area T of the picture by the area S, or by diving the area of the remaining region or regions not included in S in the picture, by the area S.

When the road ahead is broad and open, the area of the road image increases and hence the quantity C decreases. When, on the other hand, the area of image attribute within a predetermined range corresponding to the image of a road surface is small, the quantity C becomes greater.

At a step S34, the control system determines the correction quantities $\delta L$ and $\delta$ corresponding to the quantity C in accordance with the characteristics of FIGS. 4 and 5. At a step 35, the control system determines the corrected distance L and the corrected travel speed vs according to the equations (2) and (3).

In the situation where the road is narrow, or roadside trees and buildings occupy a wide area, "seeing" is complicated, and the quantity C increases. In response to the increase of the quantity C, this control system adjusts the speed control so as to increase the distance between the controlled vehicle and another vehicle ahead, and to decrease the travel speed vs in conformity with driver's expectation.

After the step S25 in FIG. 3, or after the step S35 in FIG. 6, it is possible to add a forcible speed setting step for enabling the driver to change the travel speed vs if the driver is not satisfied with the travel speed vs corrected with the correction quantity $\delta$. In this case, the driver can change the travel speed by inputting a desired speed with the input device 2. At the forcible speed setting step following the step S25 or S35, the travel speed vs is forcibly set at a value corresponding to the driver's input.

The control system may be arranged to judge that the constant speed control is not adequate when at least one of the correction quantities $\delta L$ and $\delta$ becomes greater than or equal to a predetermined level. In this case, the control system warns the driver with an indication of "The constant speed control is inadequate", and thereafter stops the constant speed control simultaneously with a warning sound. For example, the control procedure of FIG. 3 or FIG. 6 further includes, after the step S25 or S35, a step for comparing the first correction quantity $\delta L$ with a predetermined first limit value, and the second correction quantity $\delta$ with a predetermined second limit value, and a step for terminating the constant speed control and producing a warning signal if either or both of the correction quantities are equal to or higher than the respective limit values.

The thus-constructed control system according to the first embodiment can detect situations involving alleys, complicated roads and parked cars along the curb. In these situations, the control system can detect a factor which affords the driver opportunities of driving slowly, and provide a speed control performance of the vehicle speed and vehicle-to-vehicle distance satisfying the driver. The control system monitors not only the vehicle-to-vehicle distance but also the other information about the environment. In a situation in which the constant speed control is inadequate, the control system can terminate the constant speed control before increasing mental stress of the driver.

Figure 7:
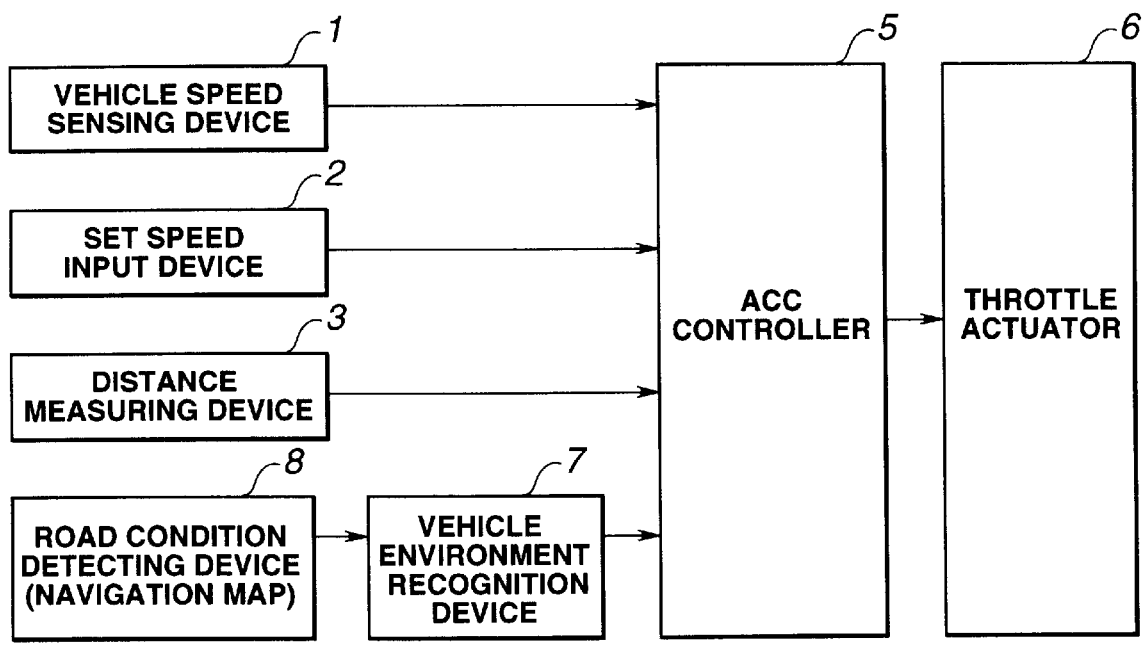
FIG. 7 is a block diagram showing a vehicle speed control system according to a second embodiment of the present invention.

FIG. 7 shows a second embodiment of the present invention. In this embodiment, the camera 4 is replaced by a road condition detecting device 8 for detecting road conditions such as road width, road attribute (or road rank or grade) and intersections. In this example, the road condition detecting device 8 includes a storage device storing a road map such as a digital road map used in an in-car navigation system and a positioning device for detecting the current position of the controlled vehicle on the road map. The road condition detecting device 8 obtains road information around the current position of the controlled vehicle from the road map. In this example, the storage device and the vehicle position detecting device used in the navigation system are both connected with the recognition device 7 so that a signal is supplied from each of the storage device and the position detecting device to the recognition device 7.

The control procedure according to the second embodiment is fundamentally identical to the procedure of the first embodiment except for the calculation of the quantity C. In this example, the control system calculates road parameters of the forward road ahead from data of the road map of the vehicle navigation system, and calculates the quantity C from the road parameters. The road parameters of this example are the width of a road, the attribute (or rank) of a road and the number of node points (or intersections) and operation points. In this example, the attribute of a road is a parameter indicative of the rank, grade or type of the road. For example, narrow roads, national roads, highways, streets are classified into respective different ranks.

Figure 8:
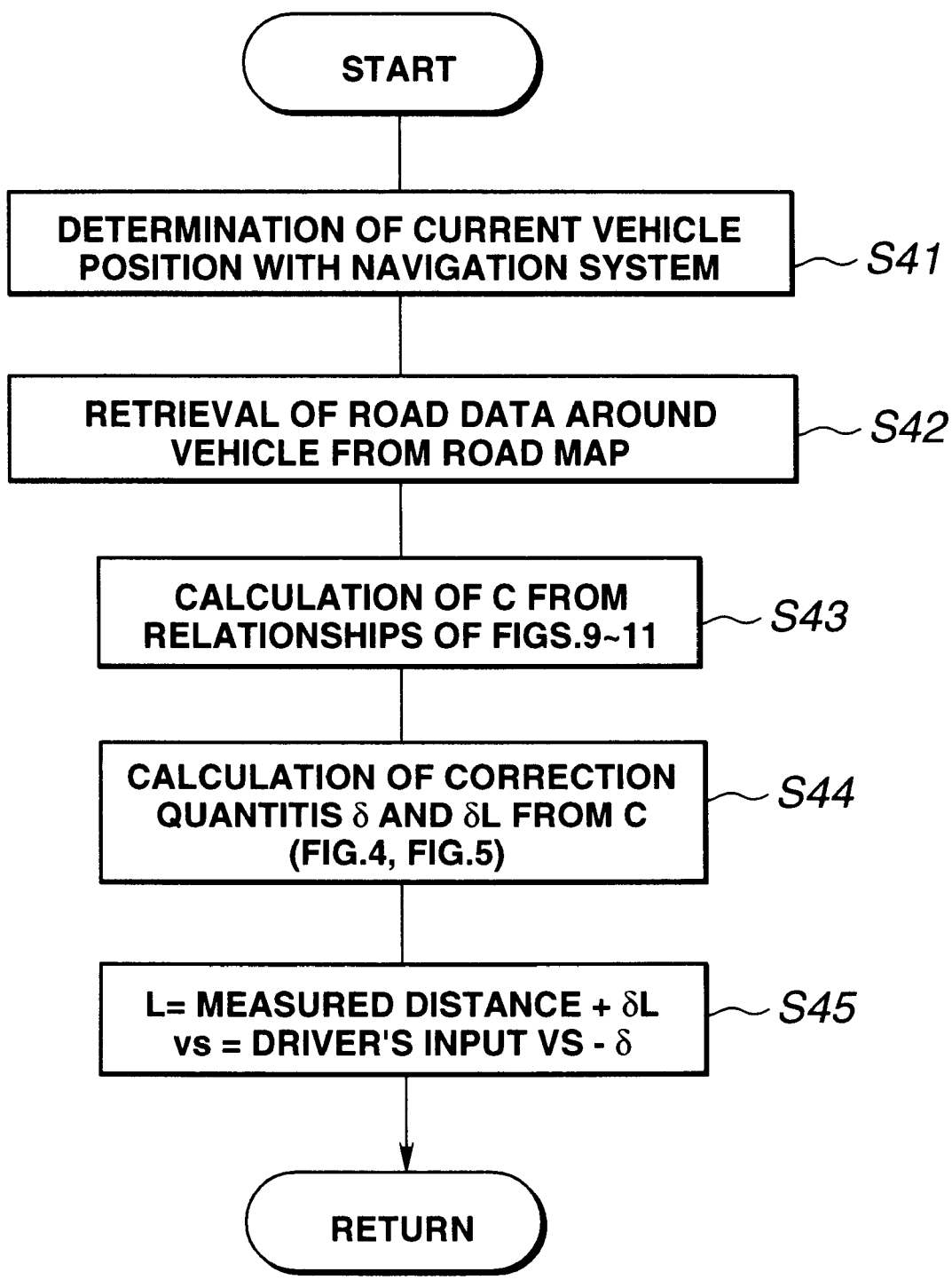
FIG. 8 is a flowchart showing a control procedure performed by the control system of FIG. 7.

FIG. 8 shows a logic for calculating the quantity C in accordance with data of the vehicle navigation system.

At a step S41, the controller section determines the current vehicle position of the controlled vehicle from data from the navigation system. At a step S42, the controller section obtains, from the road map of the navigation system, data about the road width (first road parameter), road rank (second road parameter) and number of intersections (third road parameter) around the current vehicle position. At a step S43, the controller section determines the quantity C corresponding to each of the road width, road rank and number of intersections in accordance with characteristics shown in FIGS. 9 11. In this example, the final quantity C is set equal to the greatest of the thus-determined three quantities C.

Then, the controller section determines the correction quantities $\delta L$ and $\delta$ corresponding to the quantity C determined at the step S43 in accordance with the characteristics of FIGS. 4 and 5 as in the process of FIG. 3. At a step 45, the controller section determines the corrected distance L and the corrected travel speed vs according to the equations (2) and (3).

Figure 9:
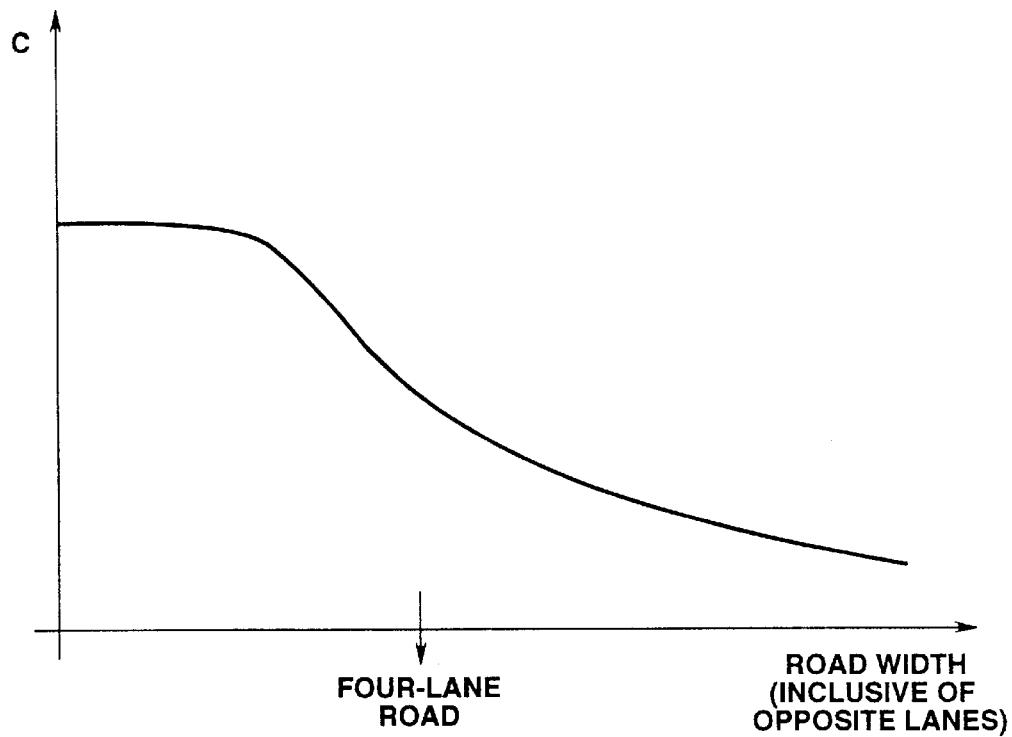
FIG. 9 is a graph showing a characteristic curve between the quantity C and a road width, used in the control system of FIG. 7.
Figure 10:
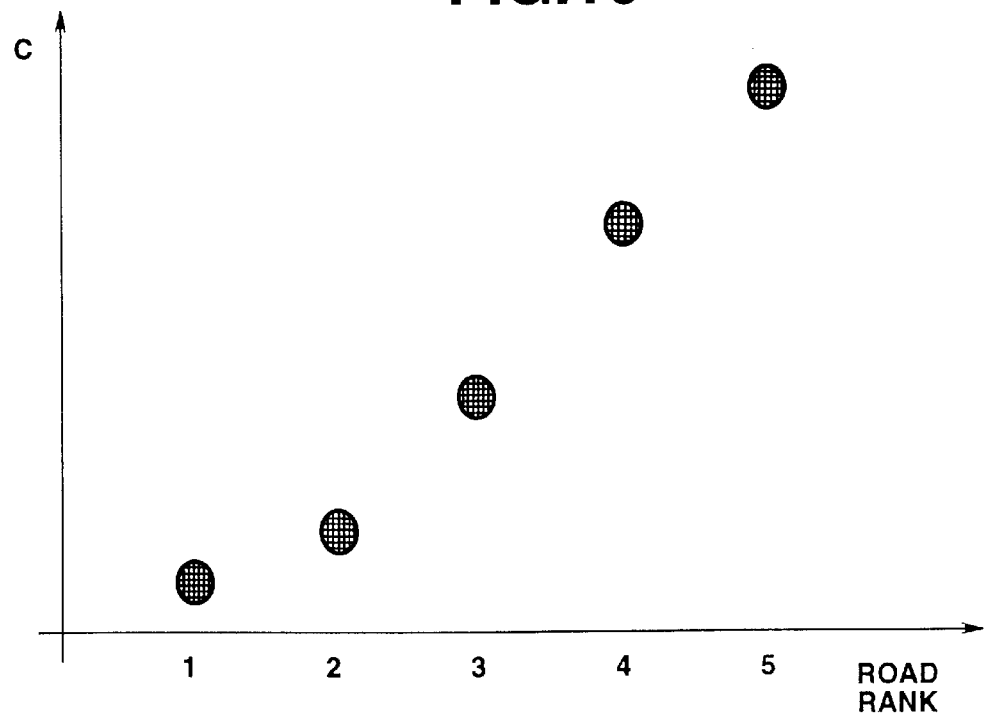
FIG. 10 is a graph showing a characteristic curve between the quantity C and a road rank, used in the control system of FIG. 7.
Figure 11:
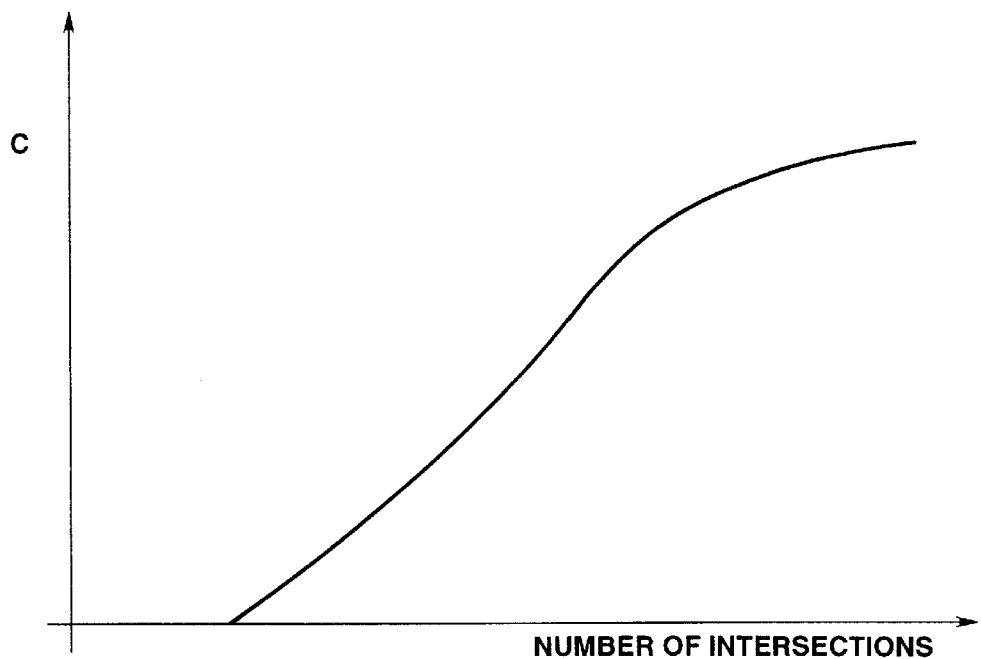
FIG. 11 is a graph showing a characteristic curve between the quantity C and a number of intersections, used in the control system of FIG. 7.

FIG. 9 shows a relationship between the road width and the quantity C. FIG. 10 shows a relationship between the road rank and the quantity C. FIG. 11 shows a relationship between the number of intersections and the quantity C. In this example, these relationships are stored in the form of data maps. As shown in FIGS. 9 and 11, the quantity C decreases as the road width increases, and the quantity C increases as the number of intersections increases. In the example shown in FIG. 11, 1 denotes a rank of broad highways designed for high speed traffic, 2 denotes a rank of automobile roads for automobiles only, 3 denotes a rank of national roads having two or more lanes, 4 denotes a rank of ordinary national roads, and 5 denotes a rank of streets in cities and towns. The quantity C becomes lower in highways and automobile roads, and becomes higher in ordinary national roads and streets. The quantity C increases in the order of the ranks 1, 2, 3, 4 and 5.

Instead of the road map of the navigation system, it is possible to employ an onboard receiver or information communicating device for communicating with road traffic infrastructure. The receiver is connected with the recognition device 7, and a signal is supplied from the receiver to the recognition device 7. The onboard receiver receives information from a transmitter of the. infrastructure such as a beacon or a communicating system. From the received information, the recognition device 7 extracts data on the road parameters such as the road width, road rank and number of intersection around the vehicle. Furthermore, the road width can be detected by using the forward viewing camera 4. From the picture of the road ahead taken by the camera 4, the recognition device 7 can detect the image of the road and determine the width of the road by a known image processing technique.

The control system of this embodiment using the road map of the navigation system can detect the conditions of roads ahead of the current vehicle position in advance, and adjust the control characteristic in accordance with the conditions of roads ahead. For example, a road may have a wide section of a wide width, immediately followed by a narrow section where the number of lanes is decreased. In this case, the control system of this embodiment can predict from the map that the increase of the road width is soon followed by the next decrease of the road width, and continue the steady control without changing the vehicle-to-vehicle distance and the travel speed immediately after the increase of the road width. Thus, the control system can prevent frequent repetition of acceleration and deceleration and drive the vehicle smoothly.

Figure 12:
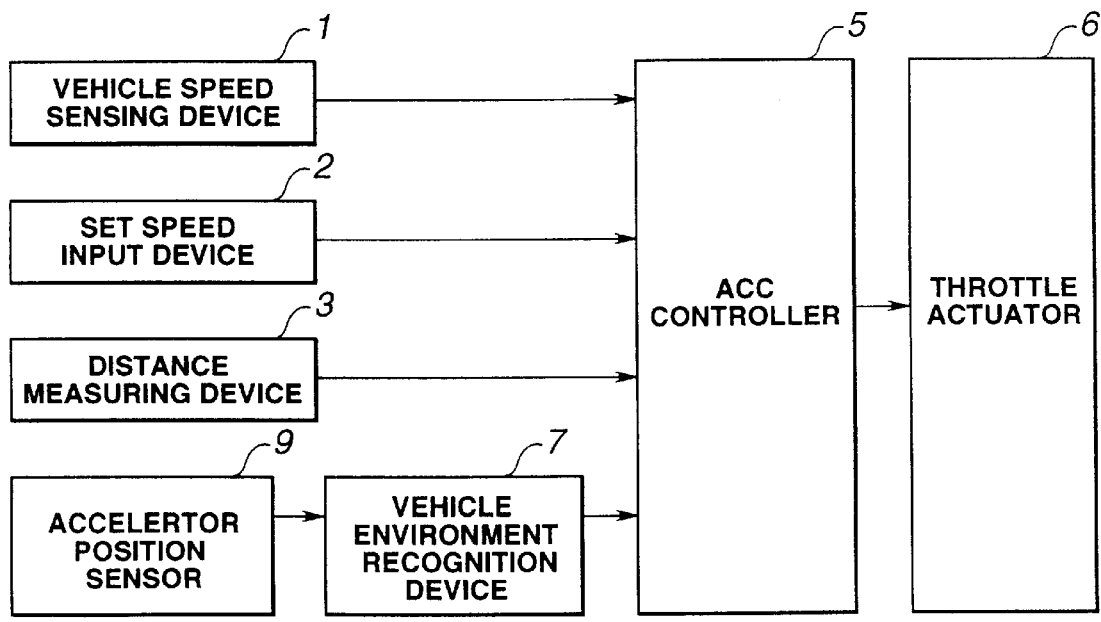
FIG. 12 is a block diagram showing a vehicle speed control system according to a third embodiment of the present invention.

FIG. 12 shows a control system according to a third embodiment of the present invention. As shown in FIG. 12, the camera 4 is replaced by an accelerator position sensor (or accelerator opening sensor) 9. The control system estimates the driver's negative affordance to the environment from the accelerator operation of the driver. The accelerator is not operated during the ACC control. Therefore, the control system of this example determines the quantity C from a variation of the accelerator opening over a predetermined time interval (10 minutes, for example) immediately before the start of the ACC control.

Figure 13:
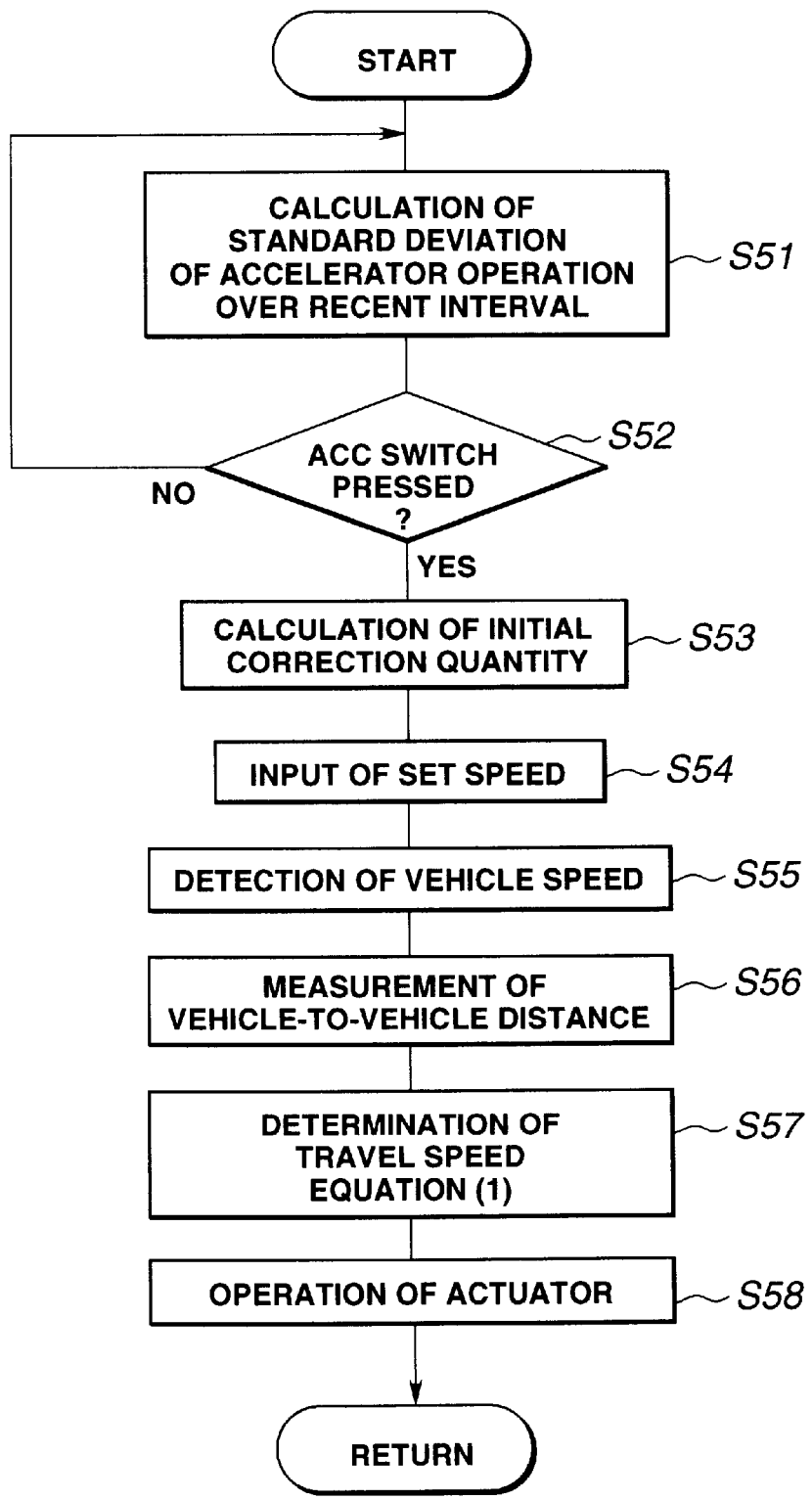
FIG. 13 is a flowchart showing a part of a control procedure performed by the control system of FIG. 12.
Figure 14:
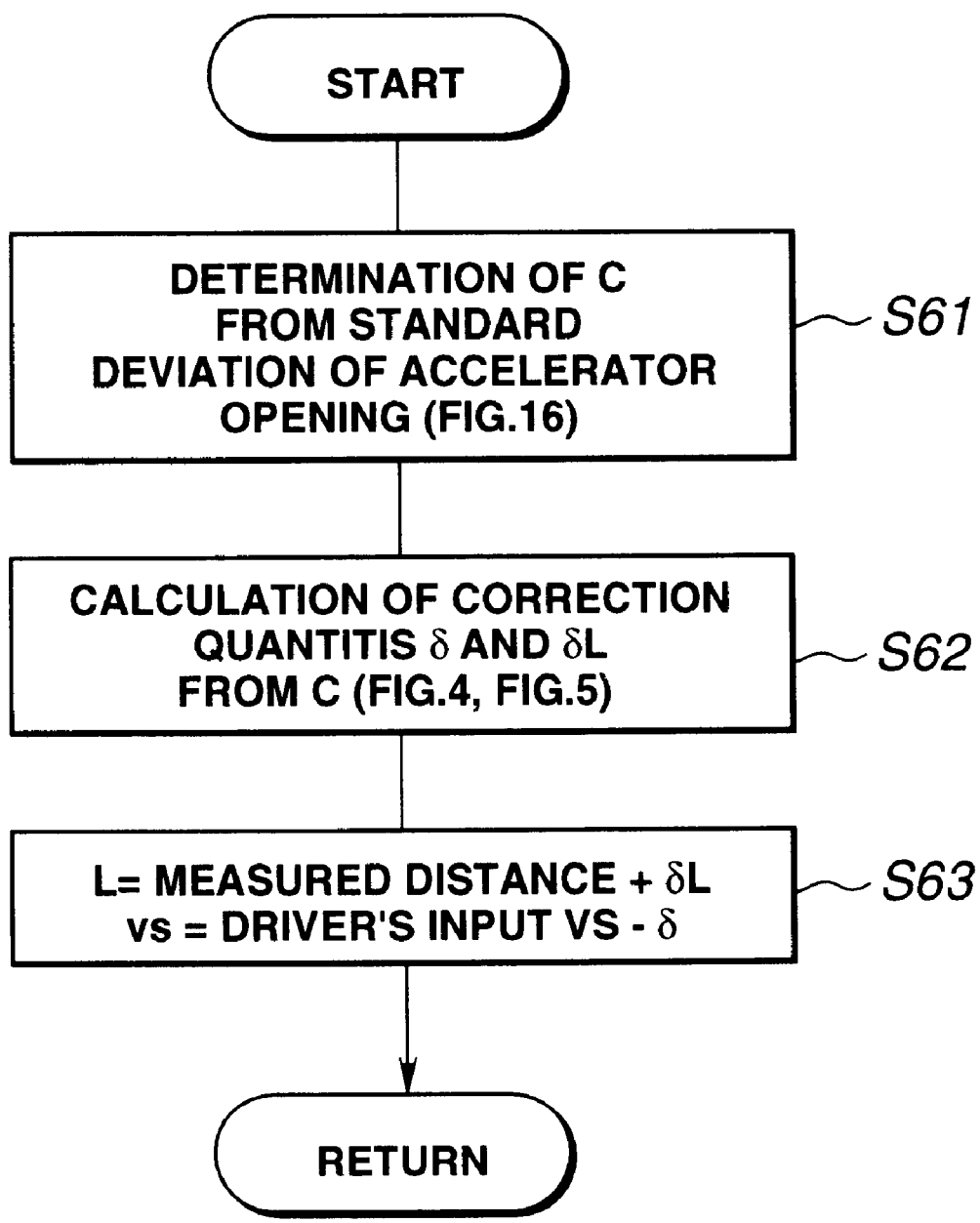
FIG. 14 is a flowchart showing the remaining part of the control procedure shown in FIG. 12.

FIG. 13 shows a control procedure performed by the control system of FIG. 12, and FIG. 14 shows steps S53 and S57 more in detail.

At a step S51 of FIG. 13, the controller section receives the signal from the accelerator sensor 9, and determines a standard deviation from a predetermined number of sampled values of the throttle opening sampled during a predetermined time interval (of about 10 minutes). The control system calculates the standard deviation of the throttle opening always even when the ACC control is out of operation.

At a step S52, the control system checks whether an ACC switch is operated or not. The ACC switch is a switch operated by the driver to start the ACC control. In this example, the ACC switch is connected with the recognition device 7. If the ACC switch is off, then the control system returns to the step S51. If the ACC switch is on, the control system proceeds from the step S52 to a step S53.

At the step S53, the control system determines the (initial) quantity C from the standard deviation obtained from the throttle opening data from a past instant the predetermined interval ago, to the instant at which the ACC switch is turned on.

Then, the control system obtains the set speed VS chosen by the driver from the input device 2 at a step S54, the actual vehicle speed v(t) of the controlled vehicle from the vehicle speed sensing device 1 at a step S55, and the distance L(t) from a vehicle ahead to the controlled vehicle from the distance measuring device 3 at a step S56.

At a step S57, the control system determines the (initial) correction quantities δL and δ corresponding to the quantity C of the step S53 in accordance with the characteristics of FIGS. 4 and 5, and determines the corrected vehicle-to-vehicle distance L and the corrected travel speed vs in accordance with the equations (2) and (3).

In FIG. 14, a step S61 corresponds to a step S53 of FIG. 13, and steps S62 and S63 correspond to the step S57.

Figure 16:
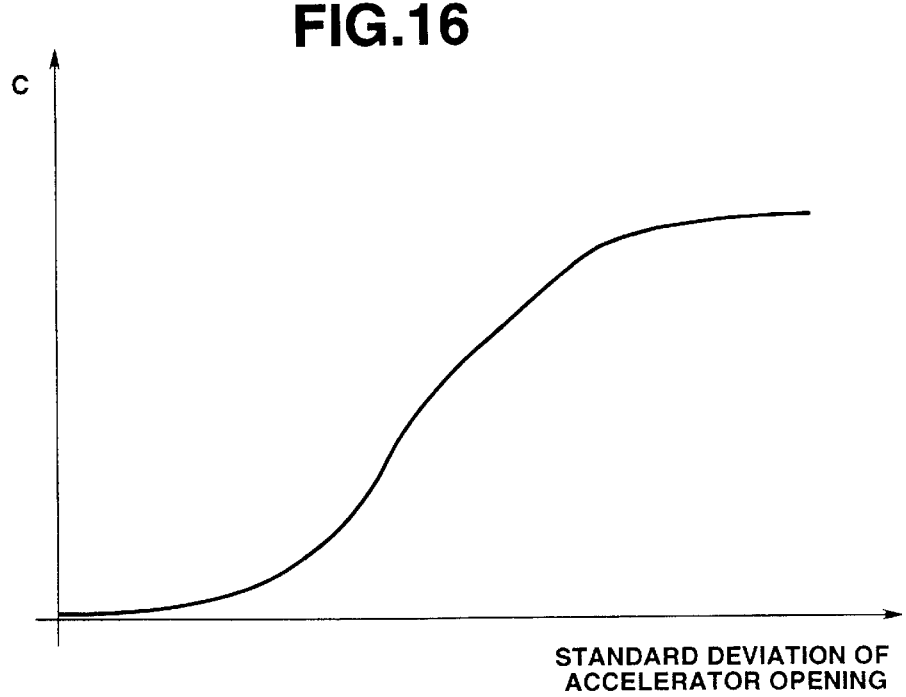
FIG. 16 is a graph showing a relationship between the quantity C and the standard deviation of the accelerator opening, used in the control system of FIG. 12.

At the step S61, the controller section determines the (initial) quantity C from the standard deviation of the accelerator opening determined by the step S51, in accordance with a characteristic shown in FIG. 16.

At the step S62, the controller section determines the (initial) correction quantities δL and δ corresponding to the quantity C determined by the step S61, in accordance with the characteristics of FIGS. 4 and 5. The (initial) correction quantities determined from the standard deviation are always used for correction until the system is reset. When the third embodiment is combined with one of the first and second embodiment, the (initial) correction quantities based on the standard deviation of the accelerator opening are always added.

At the step S63, the controller section determines the corrected distance L and the corrected travel speed vs in accordance with the equations (2) and (3).

Figure 15:
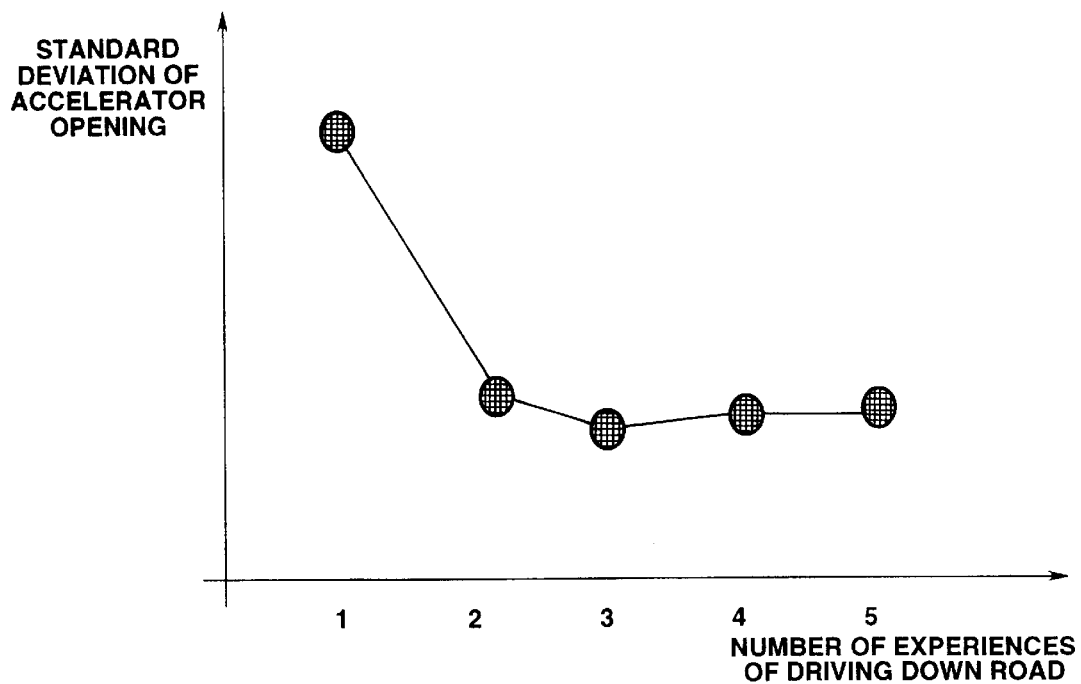
FIG. 15 is a graph showing a relationship between a standard deviation of an accelerator opening used in the control system of FIG. 12 and a number of experiences of driving down a road.

The control system according to this embodiment uses the standard deviation of the accelerator opening as an index indicating how sensitive the driver is to a negative affordance. FIG. 15 shows a relation between the standard deviation of the accelerator opening and the number of driver's experiences of driving down a road. The relation is obtained from experimental results. As shown in FIG. 15, the standard deviation varies as the driver repeats an experience of driving through the same road.

When the driver is new to the road, the driver tends to drive carefully, so that the driver's operation on the accelerator becomes abrupt, and the standard deviation increases. Without information about forthcoming circumstances, the driver performs a corrective action to adjust the accelerator opening repeatedly at short intervals by checking the circumstances (and feeding back). As a result, the driver operates the accelerator frequently. When, on the other hand, the road is familiar to the driver, and the driver has a good knowledge of the circumstances ahead, the driver can drive smoothly without useless accelerator operations, and hence the standard deviation decreases. When the standard deviation is large, it is judged that the driver is driving carefully. When the ACC control is initiated thereafter, the control system controls the vehicle speed so as to increase the vehicle-to-vehicle distance if the standard deviation is high, and thereby provides a control performance satisfying the driver.

FIG. 16 shows a characteristic relationship between the standard deviation of the accelerator opening and the quantity C. The quantity C increases monotonically as the standard deviation increases.

The driver can remove the correction at the driver's discretion. The control system does not perform the correction of this embodiment responsive to the accelerator opening when the ACC switch is turned on after entering a highway from an ordinary road. The control system detects the attribute (or rank) of the road which the vehicle is currently running on, with the navigation system, for example, and prevents the correction based on the accelerator opening when the vehicle enters a highway from an ordinary road and thereafter the ACC switch is turned on. This correction is designed to modify the constant speed characteristic on roads of a predetermined rank in accordance with the standard deviation of the accelerator opening on roads of the same rank. The control system does not modify the control characteristic on a road of a rank by the standard deviation on a road of another rank.

The thus-constructed control system of this embodiment monitors the driver's driving operation to detect the driver's environment recognition characteristic and adapts the ACC control characteristic more adequately to the expectation of the driver.

It is possible to combine two or more of the first, second and third embodiments of the present invention.

The control system of the present invention estimates the negative affordance the driver feels about the driving environment, and determines the ACC control characteristic in accordance with the result of the estimation. Therefore, the control system can provide a satisfactory ACC control performance.

According to the illustrated embodiments of the present invention, a vehicle speed control system for a controlled vehicle, comprises:

an input section comprising a first input subsection (such as the device 1) for sensing an actual vehicle speed of the controlled vehicle, a second input subsection (such as the device 2) for inputting a desired set speed, and a third input subsection (such as the device 3) for measuring a distance of the controlled vehicle from a vehicle ahead;

an actuator section (such as the device 6) for varying the vehicle speed of the controlled vehicle in response to a control signal;

a controller section (such as the items 5 and 7) for controlling the actual vehicle speed of the controlled vehicle by producing the control signal according to a control characteristic in response to input signals sent from the first, second and third input subsections.

In the control system, the input section further comprises a fourth input subsection (such as any one of the devices 4, 8 and 9) for collecting information on a driving environment perceived by a driver of the controlled vehicle, and the controller section (5, 7) is configured to determine an environment recognition characteristic quantity (such as the quantity C) in accordance with the information collected by the fourth input subsection and to modify the control characteristic in accordance with the environment recognition characteristic quantity.

The controller section may be configured to determine a first parameter representing the set speed supplied from the second input subsection, a second parameter representing the distance measured by the third input subsection, and a third parameter representing the distance measured by the third input subsection, and to set a target travel speed equal to a first target speed when the third parameter is equal to or greater than a predetermined parameter value and to a second target speed when the third parameter is smaller than the predetermined parameter value. The control section produces a control signal so as to reduce a difference between the actual vehicle speed and the target travel speed and delivers the control signal to the actuator section. The first target speed is equal to the first parameter which is dependent on the set speed and independent from the distance, and the second target speed decreases monotonically as the second parameter decreases. The control section modifies the speed control characteristic by modifying at least one of the first, second and third parameters in accordance with the recognition characteristic quantity. For example, the controller section determines a distance correction quantity and a speed correction quantity each of which is a monotone increasing function of the environment recognition characteristic quantity, further determines the first parameter by subtracting the speed correction quantity from the set speed, the second parameter by adding the distance correction quantity to the measured distance, and setting the third parameter equal to the second parameter.

The controller section may comprise at least one CPU. In the illustrated examples, the controller section comprises the ACC controller 5 and the recognition device 7. The camera 4 may be a video camera producing a video signal. The camera 4 may comprise an image sensor or imager.

What is claimed is:

1. A vehicle speed control system comprising:
    first means for inputting a set speed in response to a driver's operation;
    second means for sensing an actual vehicle speed of a controlled vehicle;
    third means for measuring a distance of the controlled vehicle from a forward vehicle in front of the controlled vehicle;
    fourth means for setting a desired travel speed in accordance with the set speed, the actual speed and the distance;
    fifth means for controlling the actual vehicle speed to the desired travel speed;
    sixth means for estimating a road environment recognition characteristic for a driver of the controlled vehicle; and
    seventh means for determining at least one of the distance and the travel speed in accordance with the road environment recognition characteristic.

2. A vehicle speed control system as claimed in claim 1 wherein said sixth means includes means for estimating the road environment recognition characteristic in accordance with a degree of difficulty in obtaining a distant view along a forward road.

3. A vehicle speed control system as claimed in claim 1 wherein said sixth means comprises imaging means for forming an image of a forward road, edge detecting means for detecting edges in the image and determining a characteristic quantity which is a number of detected edges, and correction calculating means for determining a value of a first correction quantity corresponding to the characteristic quantity according to a first relationship between the first correction quantity and the characteristic quantity and a value of a second correction quantity corresponding to the characteristic quantity according to a second relationship between the second correction quantity and the characteristic quantity, and said seventh means includes means for determining the distance and the travel speed by addition of said first and second correction quantities to the distance and the set speed, respectively.

4. A vehicle speed control system as claimed in claim 1 wherein said sixth means comprises imaging means for forming an image of the forward road, area ratio calculating means for calculating a characteristic quantity which is a ratio of an area of at least one region having a predetermined image attribute to a total area of the image of the forward road, and correction calculating means for calculating, from the characteristic quantity, first and second correction quantities for the distance and the travel speed according to first and second predetermined relationships, and said seventh means includes means for determining the distance and the travel speed by addition of said first and second correction quantities to the distance and the set speed, respectively, said image attribute being one of a predetermined luminance level and a predetermined color.

5. A vehicle speed control system as claimed in claim 1 wherein said sixth means includes means for estimating said road environment recognition characteristic in accordance with a road parameter which is one of a road width, a road rank and a number of branch points of a road.

6. A vehicle speed control system as claimed in claim 5 wherein said sixth means is connected with an onboard navigation system, and configured to receive information on the road parameter from the onboard navigation system.

7. A vehicle speed control system as claimed in claim 5 wherein said sixth means is connected with an information communicating device for receiving information on the road parameter from a road traffic infrastructure.

8. A vehicle speed control system as claimed in claim 5 wherein said sixth means is connected with imaging means for forming an image of a forward road, and configured to obtain information on the road parameter from the image of the forward road.

9. A vehicle speed control system as claimed in claim 1 wherein said sixth means includes means for determining a standard deviation of an accelerator opening over a predetermined time interval before a start of a constant speed control, and for estimating the road environment recognition characteristic in accordance with the standard deviation.

10. A vehicle speed control system for a controlled vehicle, comprising:

an input section comprising a first input subsection for sensing an actual vehicle speed of the controlled vehicle, a second input subsection for inputting a desired set speed, and a third input subsection for measuring a distance of the controlled vehicle from a vehicle ahead;

an actuator section for varying the vehicle speed of the controlled vehicle in response to a control signal;

a controller section for controlling the actual vehicle speed of the controlled vehicle by producing the control signal according to a control characteristic in response to input signals sent from the first, second and third input subsections;

wherein the input section further comprises a fourth input subsection for collecting information on a driving environment perceived by a driver of the controlled vehicle, and the controller section is configured to determine an environment recognition characteristic quantity in accordance with the information collected by the fourth input subsection and to modify the control characteristic in accordance with the environment recognition characteristic quantity.

11. A vehicle speed control system as claimed in claim 10 wherein the fourth input subsection comprises a device which is one of an imager for forming an electronic image of a road ahead of the controlled vehicle, a storage device for storing a road map, an onboard data communicating device for obtaining road traffic information from an outside of the vehicle, and an accelerator position sensor for sensing a position of a vehicle accelerating system operated by a driver.

12. A vehicle speed control system as claimed in claim 10 wherein the controller section is configured to determine a correction quantity in accordance with the environment recognition characteristic quantity, to determine a target travel speed in accordance with the set speed, the distance and the correction quantity and to produce the control signal so as to reduce a deviation of the actual vehicle speed from the target travel speed.

13. A vehicle speed control system as claimed in claim 12 wherein the control section is configured to determine a first parameter comprising a first term equaling the set speed supplied from the second input subsection, a second parameter comprising a first term equaling the distance measured by the third input subsection, and a third parameter comprising a first term equaling the distance measured by the third input subsection, and to set the target travel speed equal to a first target speed when the third parameter is equal to or greater than a predetermined parameter value and to a second target speed when the third parameter is smaller than the predetermined parameter value, the first target speed is dependent on the set speed and independent from the distance, the first target speed is equal to the first parameter, the second target speed is dependent on the distance and decreases as the second parameter decreases, and at least one of the first, second and third parameters further comprises a second term determined in accordance with the correction quantity.

14. A vehicle speed control system as claimed in claim 13 wherein the fourth input subsection comprises a device for collecting information on one of a visual driving environment of the vehicle and a variation of a throttle opening degree for an engine of the vehicle to determine the environment recognition characteristic quantity representing a mental attitude of the driver to the visual driving environment.

15. A vehicle speed control system as claimed in claim 13 wherein the fourth input subsection comprises a device for obtaining information on a situation of a road ahead, and the controller section is configured to determine the environment recognition characteristic quantity from the information collected by the device of the fourth input subsection.

16. A vehicle speed control system as claimed in claim 15 wherein said fourth input subsection further comprises an accelerator position sensor for determining a driver's accelerator input by sensing a condition of an accelerator system of the vehicle, and the controller section is configured to monitor variation of the driver's accelerator input, to calculate a standard deviation of the driver's accelerator input over a predetermined time interval, and to determine the recognition characteristic quantity in accordance with the standard deviation, and wherein the controller section is configured to increase the characteristic quantity as the standard deviation increases, and to decrease the vehicle speed as the characteristic quantity increases.

* * * * *